July 18, 1967 J. P. ECKERT, JR 3,332,075

NONDESTRUCTIVE READOUT THIN FILM MEMORY ARRAY

Original Filed March 18, 1963

3 Sheets-Sheet 1

| | |
|---|---|
| FIG. 1a | FIG. 1b |

INVENTOR
JOHN PRESPER ECKERT JR.
BY
Fred Fisher
ATTORNEY 3,332,075

NONDESTRUCTIVE READOUT THIN FILM MEMORY ARRAY

John Presper Eckert, Jr., Gladwynne, Pa., assignor to Sperry Rand Corporation, New York, N.Y., a corporation of Delaware Continuation of application Ser. No. 265,843, Mar. 18, 1963. This application Aug. 15, 1966, Ser. No. 572,626
4 Claims. (Cl. 340—174)

This invention is a continuation of my application Ser. No. 265,843, filed Mar. 18, 1963.

This invention relates to memory arrays, and more particularly relates to novel thin-film memory arrays utilizing a word-oriented memory.

In the past, memory arrays have been constructed using ferrite cores having rectangular hysteresis characteristics. These cores, in the past, have been arranged using a "coincident current" selection system which utilizes a pair of wires through each core, the combination of the two wires being unique for each core. Upon coincidence of the same current level signal on each wire, the desired core was selected or switched. Cores which received the excitation from one of these wires, but not the other, received one-half the excitation current of the selected core. Such a memory system can be termed a two-to-one discrimination ratio in that the ratio of the maximum critical excitation which causes switching to the maximum sub-critical excitation which does not cause switching is 2:1.

Ferrite core memories are relatively expensive. In addition to the cost of manufacture for each core, a threading operation is required to thread the pair of wires through the cores of the matrix. Furthermore, coincident current memories usually are destructive during a reading operation, thereby requiring additional circuitry to re-write the information read out back into the various cores.

Therefore, it is an object of this invention to provide a novel magnetic memory which is less expensive than memories of the prior art.

A further object of this invention is to provide a novel word-oriented thin film memory having a non-destructive read out therefrom.

Still another object of this invention is to provide a novel thin film magnetic memory with a three-to-one discrimination ratio having memory elements which do not need the same degree of rectangular hysteresis characteristics as do the aforementioned 2:1 coincident current memories.

In accordance with a preferred embodiment of this invention, a magnetic memory array is constructed of a plurality of thin magnetic anisotropic films. A pair of wires is coupled to each film, the combination of the two wires being unique for each film. A "two-dimensional" array is created utilizing a three-to-one flux selection scheme so that the maximum critical excitation which causes switching to the maximum sub-critical excitation which does not cause switching is 3:1. With such a 3:1 flux selection scheme, it is not necessary that the films have the same degrees of rectangular hysteresis characteristics as ferrite cores, although many films exist with higher rectangularity than cores.

A thin film memory of $n$ groups of words of $n$ words each is constructed having $c$ bits per word. An address signal is coupled to operate a word group selector having $n$ output lines therefrom, and a word of a group selector having $n$ output lines therefrom. A word of information is coupled through amplifiers onto $c$ bit lines. Each of the $c$ lines is coupled to film elements for each word. Each of the $n$ lines is coupled to film elements for the $n$ groups of words. Each of the $n$ lines, together with a "write" signal, is coupled to a separate "and' gate for its corresponding group of words. Also coupled to the "and" gate are the bit lines for the corresponding group of selected words. A reading operation is performed by utilizing another set of "and" gates which receive input signals from the $n$ lines and the bit lines. By actuating a "word of a group" line of a word of a group sense (read) selector, signals stored in the films are read out onto their bit lines through the "and" gates.

Other objects and advantages of this invention, together with its construction and mode of operation, will become more apparent from the following description, when read in conjunction with the accompanying drawing, in which:

FIGS. 1*a* and 1*b*, when taken together as illustrated in FIG. 1 form a diagram of one embodiment of this invention;

FIG. 2*a* is a signal diagram of enabling pulses from one output of the "word of a group" write selector shown in FIG. 1*a*;

FIG. 2*b* is a signal diagram of inhibit pulses from the remaining outputs of the "word of a group" write selector shown in FIG. 1*a*;

FIG. 2*c* is a signal diagram of enabling pulses occurring on actuated bit lines for a "group of words" selected, there being an absence of a signal on non-actuated bit lines;

FIG. 2*d* is a signal diagram showing the effective drive for a selected memory element;

FIG. 2*e* is a signal diagram showing the effective drive for non-selected memory elements;

Figures 2A, 2B, 2C, 2D, 2E, 3, 4, 5, 6, 7A, 7B, 8A, 8B:
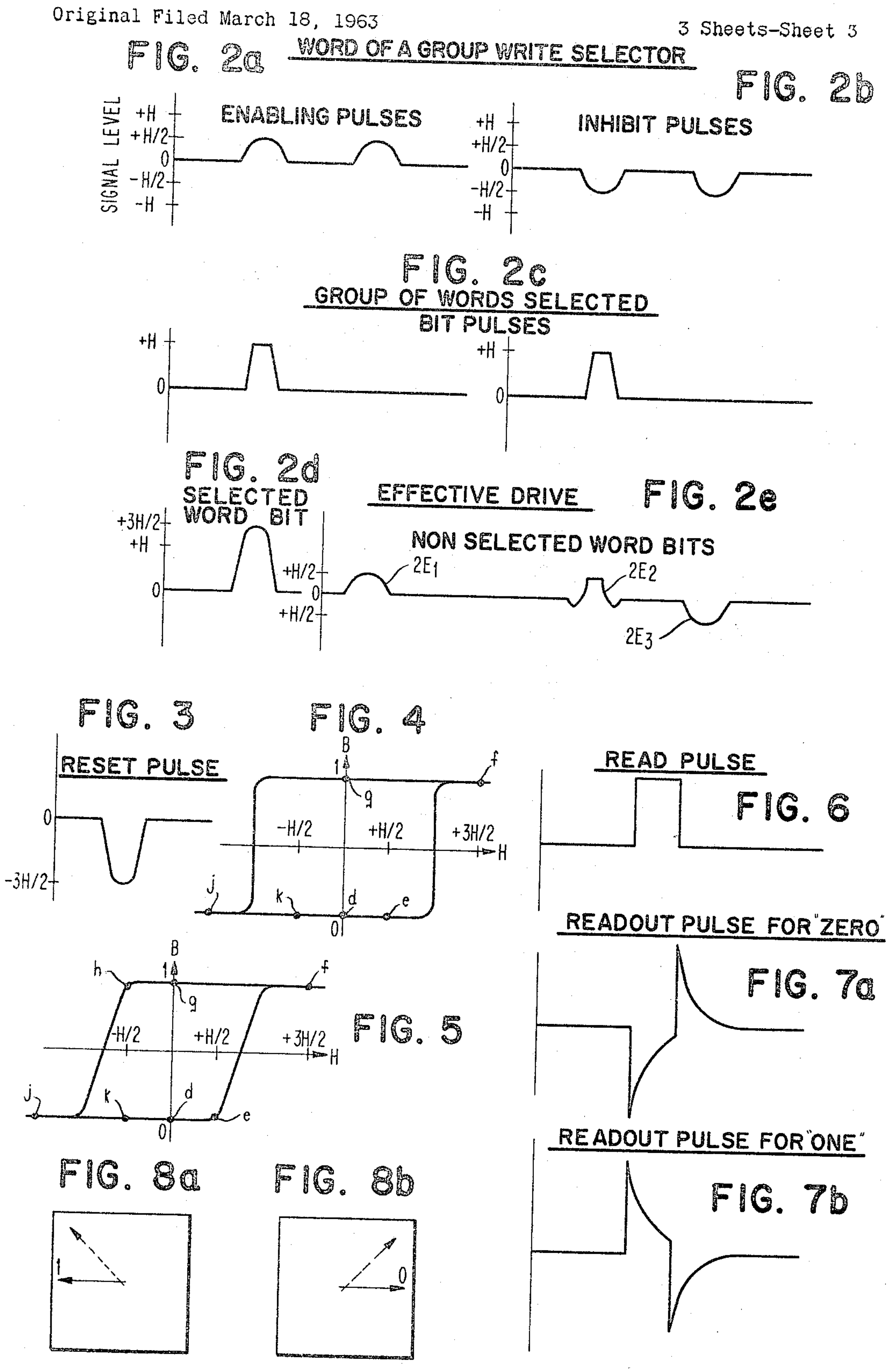
FIG. 3 is a signal diagram showing a reset pulse.
FIG. 4 shows a curve having a rectangular hysteresis B-H characteristic, such as found in ferrite cores and many thin films.
FIG. 5 shows a curve having less than rectangular hysteresis B-H characteristic common to several types of thin magnetic anisotropic films.
FIG. 6 is a signal diagram showing a read pulse from the word of a group read selector, shown in FIG. 1*a*.

FIGS. 7*a* and 7*b* are signal diagrams showing a read out pulse for a "zero" and "one," respectively; and FIGS. 8*a* and 8*b* are illustrations showing the directions of magnetization during quiescence, shown in solid lines, and during a read out pulse, shown in dotted lines, for a "zero" and a "one," respectively.

Figures 1, 1B:
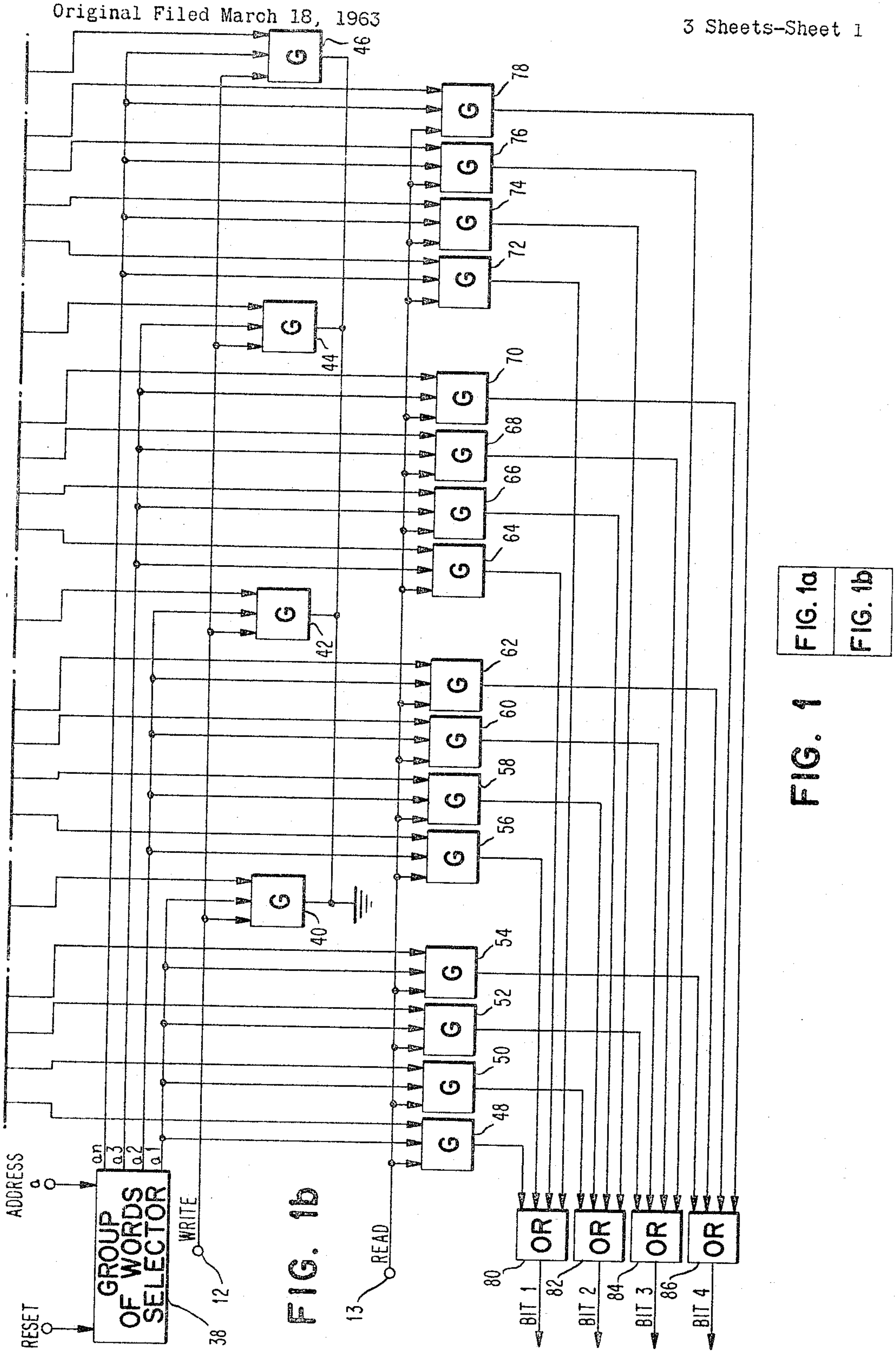
Figure 1A:
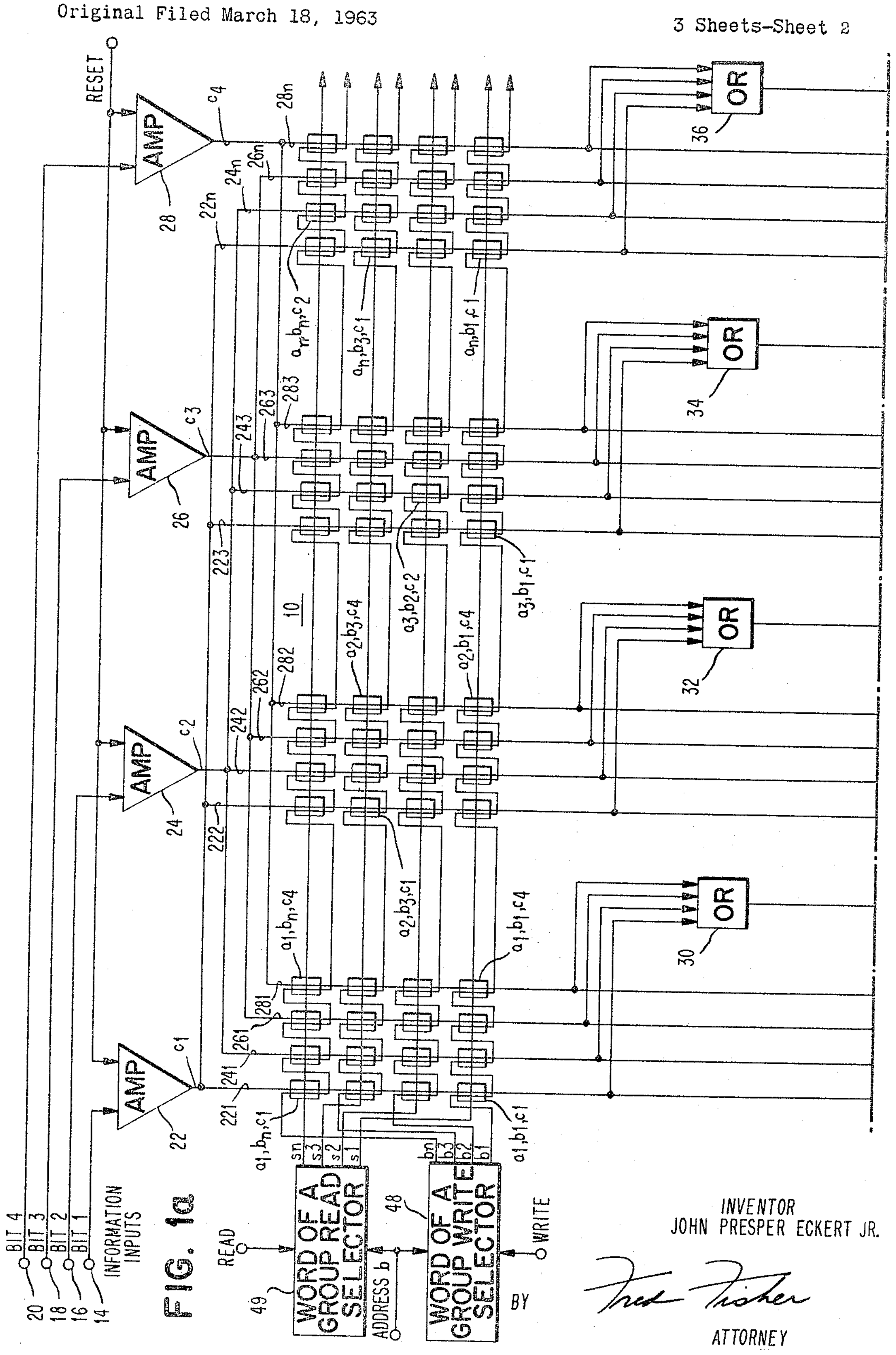

Referring to FIG. 1*a*, there is shown a plurality of thin anisotropic magnetic films 10, each having a pair of parallel drive lines coupled thereto lying parallel to the plane of the film but perpendicular to the easy axis of magnetization of the film. The drive lines are coupled to the films in a vertical direction as shown in FIG. 1*a*. Each of the films 10 has two stable modes of magnetization: magnetized toward the right or left, as viewed; one direction is termed a "one," the other direction a "zero."

Illustrated in FIG. 1*a* are $n$ groups of thin film elements 10, each group having $n$ words and each word containing $c$ bits each. For purposes of illustration, there are shown four bits of information per word; however, it is understood that larger quantities of bits per word can be used with memories, and, in commercial equipment, as many as 32 bits or more per word are often employed.

During a "write" operation, an enabling signal is presented onto a "write" line 12 (FIG. 1*b*). A word of information is presented onto the corresponding bit lines 14, 16, 18, 20 to bit amplifiers 22, 24, 26, 28, respectively. The output of the bit 1 amplifier 22 has $n$ output lines: the first line 221 is coupled through film elements 10 corresponding to the first bit for the first group of words to an "or" circuit 30; the second line 222 is coupled through film elements 10 corresponding to the first bit for the second group of words to an "or" circuit 32; the third line 223 is coupled through film elements 10 corresponding to the first bit for the third group of words to an "or" circuit 34; and the *n*th line **22*n* is coupled through film elements 10** corresponding to the first bit for the *n*th group of words to an "or" circuit 36. In a similar fashion, the outputs of the bit 2 amplifier 24, the bit 3 amplifier 26, and the bit 4 amplifier 28 each have *n* output lines: the *n* lines from the bit 2 amplifier 24 being coupled to films corresponding to the second bit for the first, second, third, and *n*th group of words, to "or" circuits 30, 32, 34, 36, respectively; the *n* lines from the bit 3 amplifier 26 being coupled to films corresponding to the third bit for the first, second, third, and *n*th group of words, to "or" circuits 30, 32, 34, 36, respectively; and the *n* lines from the bit 4 amplifiers 28 being coupled to films corresponding to the fourth bit for the first, second, third, and *n*th group of words, to "or" circuits 30, 32, 34, 36, respectively. The "write" line 12, the first line from the group of words selector 38, and the output from the "or" circuit 30 are coupled through an "and" gate 40 to a point of reference potential, such as ground. The "write" line 12, the second line from the group of words selector 38, and the output from the "or" circuit 32 are coupled through an "and" gate 42 to a point of reference potential, such as ground. Similarly, the write line 12 is coupled to "and" gates 44, 46 which receive the third and *n*th lines, respectively, from the group of words selector 38 and the outputs from the "or" circuits 34 and 36, respectively.

A word of a group write selector 48 has *n* output lines, each line being coupled to one word of *c* bits each to all of the *n* groups of words. A desired word is selected by one line from the group of words selector 38 and one line from the word of a group selector 48.

During a write operation, it is desired to write a word of information into a particular address of the memory. By way of example, a word of 1001 is desired to be written into the memory at an address $a_2b_3$.

The *a* portion of the address sets the group of words selector 38, causing the $a_2$ line to have an enabling signal; no enabling signal is present on the $a_1$, $a_3$, or $a_n$ lines. The $a_2$ signal, together with the "write" signal, opens the gate 42; the gates 40, 44, 46 remain closed.

The information signal on the bit lines 14, 16, 18, 20, representing the word to be written in the memory is amplified by the bit amplifiers 22, 24, 26, 28. With a word of 1001, as chosen by way of example, the amplifiers 22 and 28 provide positive pulses, the amplifiers 24 and 26 provide no pulses. Due to the gate 42 being open, and the gates 40, 44, 46 remaining closed, only the film elements corresponding to the $a_2$ group receive enabling pulses. In the example given, the film elements $a_2b_1c_1$, $a_2b_2c_1$, $a_2b_3c_1$, $a_2b_nc_1$, and $a_2b_1c_4$, $a_2b_2c_4$, $a_2b_3c_4$, $a_2b_nc_4$ receive enabling pulses by way of the lines 222 and 282, respectively. The pulses on these lines carry a signal level of +H, as hereinafter defined, as shown in FIG. 2*c*.

The $b_3$ portion of the address sets the word of a group selector 48, providing the $b_3$ line with an enabling pulse having a level of $+H/2$, as shown in FIG. 2*a*, and providing the $b_1$, $b_2$, $b_n$ lines with inhibit pulses of $-H/2$, as shown in FIG. 2*b*.

The pulse on the $b_3$ line (shown in FIG. 2*a*) together with the pulse (FIG. 2*c*) on each of the bit lines 222 and 282 effectively add together to produce a drive signal of $+3H/2$ as shown in FIG. 2*d* at the film elements $a_2b_3c_1$ and $a_2b_3c_4$. This signal is sufficient for switching of the film.

The film elements $a_2b_3c_2$ and $a_2b_3c_3$, in addition to other films on other word groups on the line $b_3$, receive an effective drive signal $2E_1$ shown in FIG. 2*e* having a magnitude of $+H/2$.

The film elements $a_2b_1c_1$, $a_2b_2c_1$, $a_2b_nc_1$, $a_2b_1c_4$, $a_2b_2c_4$, $a_2b_nc_4$ have effective drive signals of $+H/2$ as shown in FIG. 2*e* at $2E_2$. Other films receive an effective drive signal of $-H/2$ as shown at $2E_3$ in FIG. 2*e*.

The selected films which are switched receive effective drives of $+3H/2$; the non-selected films receive effective drives of $+H/2$. Thus, there is a 3:1 ratio of excitation between a selected film and a non-selected film.

FIG. 4 shows a B-H rectangular hysteresis characteristic for a ferrite core and many types of thin magnetic films. FIG. 5 shows a B-H curve of a lesser degree of rectangularity than the curve shown in FIG. 4. A B-H curve of the type shown in either FIG. 4 or FIG. 5 is characteristic of a large majority of thin anisotropic magnetic films.

Initially all films are reset to their "zero" state by the application of a reset pulse having an effective drive of $-3H/2$ as shown in FIG. 3. The reset pulse is applied to the group of words selector 38 which provides enabling levels on the $a_1$, $a_2$, $a_3$, $a_n$ lines to open the gates 40, 42, 44, 46 together with the write signal. The reset pulse also passes through the bit amplifiers 22, 24, 26, 28 and is coupled to every film in the memory 10 as shown in FIG. 1*a*.

The reset pulse drives a film to the point *j* as shown in FIGS. 4 and 5. Upon removal of the pulse, the film rests at one of its remanence states 0 at the point *d*. A pulse having a magnitude of $+H/2$ or $-H/2$ drives the hysteresis characteristic to the points *e* or *k* (insufficient to cause switching); upon removal of the pulse, the magnetization of the film reverts back to its 0 state at the point *d*.

When a film is at its 0 state at the point *d*, and an effective pulse is applied having a magnitude $+3H/2$, the magnetization of the film travels to a point *f*, switching the state of the film. Upon the removal of the $+3H/2$, switching pulse, the film rests at its "1" remanence state at the point *g*.

During a read operation, information is read out of the memory in a non-destructive manner. This is achieved by the use of a read-out circuit including a plurality of read gates 48–78 and "or" circuits 80–86. The gates 48, 50, 52, 56, receive a read signal, the $a_1$ line, and the lines 221, 241, 261, 281, respectively. Similarly, the gates 56, 58, 60, 62; 64, 66, 68, 70; and 72, 74, 76, 78 receive the read signal; the $a_2$, $a_3$ and $a_n$ lines, respectively; and the lines 222, 242, 262, 282; 223, 243, 263, 283; and **22*n*, 24*n*, 26*n* 28*n*, respectively. The ouputs of the gates 48, 56, 64, 72; 50, 58, 66, 74; 52, 60, 68, 76; and 54, 62, 70, 78 are passed through the "or" circuits 80, 82, 84, 86, respectively, thereby representing outputs for the bits 1**, 2, 3, 4, respectively.

Assume that 1001 is written into the $a_2b_3$ word location and it is desired to non-destructively read therefrom. The films $a_2b_3c_2$ and $a_2b_3c_3$ representing the second and third bit positions of the word each represent a "0" and their states of magnetization are oriented in the easy direction towards the right, as viewed in FIG. 1*a* and as shown in FIG. 8*b*. The films $a_2b_3c_1$ and $a_2b_3c_4$ representing the first and fourth bit positions of the word each having a "1" represented therein, are magnetized in the easy direction toward the left as shown in FIG. 8*a*. The address signal on the address line causes the group of words selector 38 to provide an enabling signal on the $a_2$ line, which, together with the "read" signal, opens the read gates 56, 58, 60, 62. The address signal selects the $s_3$ sense line of a word-of-a-group read selector 49. The $s_3$ sense line is coupled to film elements at the third word position for each group of words. The sense lines lie parallel to the easy axes of the films so that, upon application of current through a sense line, a magnetic field is created orthogonal to the easy axis of its associated film. The sense line supplies a positive pulse thereon, as shown in FIG. 6, when selected by the address during a read operation. The film elements which have "zero" recorded therein are magnetized toward the right as shown in FIG. 8*b*. A positive pulse on the sense line causes the state of magnetization of the film to temporarily switch upwardly at an acute angle with the original state of magnetization, as shown by the dotted line of FIG. 8*b*. Upon removal of the read pulse, the state of magnetization reverts back to its original position along the easy axis of magnetization as shown by the solid line of FIG. 8*b*. This reversion takes place due to the anisotropic nature of the thin film. The switching of the film from its steady state to an acute angle and back to its steady state causes an output signal to be produced on the readout lines 242, 262 as shown in FIG. 7*a*. Similarly, when a "1" is recorded in a film, such as the first and fourth bit positions of the $a_2b_3$ word, the steady state of magnetization of the film is toward the left, as shown in FIG. 8*a*. A sense pulse causes the state of magnetization to shift upward, temporarily, as shown by the dotted line in FIG. 8*a*. An output pulse is produced during the reading operation as shown in FIG. 7*b*. These output pulses for the 1, 2, 3, and 4 bit positions pass through the gates 56, 58, 60, and 62 to the "or" circuits 80, 82, 84, 86, respectively. Suitable circuitry, not shown, recognizes the pulse shown in FIG. 7*a* as a "0" and the pulse as shown in FIG. 7*b* as a "1."

The various selectors 38, 48, 49 described herein may include various types of matrixing circuits which can convert and address signal to desired signals on a plurality of output lines. Such circuits can easily be constructed by one ordinarily skilled in the art to produce desired current levels.

In the embodiment described, which sets forth the best mode contemplated by the inventor of carrying out his invention, the first selector (identified in the drawing as group of words selector 38) and the second selector (identified in the drawing as the word of a group write selector 48) each require *n* amplifiers to drive their respective output lines. Thus, for writing a word into the memory, a total of $2n$ amplifiers are required as address amplifiers for a total of $n^2$ address locations. The "square" configuration of the memory provides for minimizing the number of amplifiers, transistors, wires and other components that may otherwise be necessary with other configurations.

Thus, in the embodiment illustrated, the first selector 38 has *a* output lines therefrom, and the second selector (48 or 49) has *b* output lines therefrom. In order to minimize the number of components in the system, it is desirable that *a* to equal to *b*. However, it is obvious to those skilled in the art that other values be given to *a* and *b* dependent upon the costs of various components.

Through the practice of this invention a memory is created which utilizes a minimum of components, utilizes thin-magnetic films, and is non-destructive in character, thereby providing an optimum memory array which is extremely economical to construct.

The embodiments of the invention in which an exclusive property or privilege is claimed are defined as follows:

1. In combination, $n^2c$ thin anisotropic magnetic films arranged on a substrate in a matrix arrangement *n* x *nc* and having their easy magnetic axes aligned parallel to each other, said films forming a memory array of $n^2$ words of *c* bits each; an address bus adapted to carry address signals indicative of up to $n^2$ word locations; means for receiving a word of information in parallel form on *c* bit lines; a "group of words" selector responsive to said address signals for providing an enabling current level on one of *n* "group of words" lines; a "word of a group" selector responsive to said address signals for providing an enabling current pulse on one of *n* "word of a group" line; each one of said $n^2$ words being selected by a unique combination of one "group of words" line and one "word of a group" line; means for receiving a "write" signal; *n* "and" gates having three inputs applied thereto; one of said inputs being coupled to said "write" signal receiving means, the second of said inputs for each of said gates being coupled to a separate one of said *n* "group of words" lines, respectively, the third of said inputs being coupled to receive drive lines for *bc* films in one group of words, respectively; means coupling said information receiving means to said drive lines for respective bit positions for each word; said drive lines lying parallel to the hard axis of each said film; each one of said "word of a group" lines being coupled respectively to *c* films of each group of films, said "word of a group" lines being coupled respectively to *c* films of each group of films, said "word of a group" lines being coupled parallel to said hard axis of said films; sensing means coupled to one word of each group of films, said coupling being parallel to the easy axis of said films; and *c* read "and" gates for each group of words, each read "and" gate adapted to receive (1) a read signal, (2) a current level on one of said *n* "group of words" lines, and (3) one of said drive lines for a selected bit position for one group of words.

2. In combination, *abc* thin anisotropic magnetic films arranged in a matrix arrangement *a* x *bc* and having their easy magnetic axes aligned parallel to each other, said films forming a memory array of *ab* words of *c* bits each; an address bus adapted to carry address signals indicative of up to *ab* words locations; means for receiving a word of information in parallel form on *c* bit lines; a first selector responsive to said address signals for providing an enabling current level on one of *a* lines; a second selector responsive to said address signals for providing an enabling current pulse on one of *b* lines; each one of said *ab* words being selected by a unique combination of one *a* line and one *b* line; means for receiving a "write" signal; *a* "and" gates having three inputs applied thereto; one of said inputs being coupled to said "write" signal receiving means, the second of said inputs for each of said gates being coupled to a separate one of said *a* lines, respectively, the third of said inputs being coupled to receive drive lines for *bc* films in one group of words, respectively; means coupling said information receiving means to said drive lines for respective bit positions for each word; said drive lines lying parallel to the hard axis of each film; each one of said *b* lines being coupled respectively to *c* films of each group of films, said *b* lines being coupled parallel to said hard axis of said films; sensing means coupled to one word of each group of films, said coupling being parallel to the easy axes of said films; and *c* read "and" gates for each group of words, each read "and" gate adapted to receive (1) a read signal, (2) a current level on one of said *a* lines, and (3) one of said drive lines for a selected bit position for one group of words.

3. In combination, *abc* thin anisotropic magnetic film elements arranged in a matrix arrangement *a* x *bc* and having their easy magnetic axes aligned with respect to each other, said film elements forming a memory array of *ab* words of *c* bits each; and address bus adapted to carry address signals indicative of up to *ab* word locations; means for receiving a word of information in parallel form on *c* bit lines; a first selector responsive to said address signals for selecting one of *a* lines; a second selector responsive to said address signals for selecting one of *b* lines; each one of said *ab* words being selected by a unique combination of one *a* line and one *b* line; means for receiving a "write" signal; *a* "and" gates having three inputs applied thereto; one of said inputs being coupled to said "write" signal receiving means, the second of said inputs for each of said gates being coupled to a separate one of said *a* lines, respectively, the third of said inputs being coupled to receive drive lines for *bc* films in one group of words, respectively; means coupling said information receiving means to said drive lines for respective bit positions for each word; said drive lines lying parallel to the hard axis of each said film element; each one of said *b* lines being coupled respectively to *c* film elements of each group of film elements, said *b* lines being coupled parallel to said hard axis of said film elements; sensing means coupled to one word of each group of film elements, said sensing means adapted to generate a magnetic field orthogonal to the easy axes of said film elements;

and *c* read "and" gates for each group of words, each read "and" gate adapted to receive (1) a read signal, (2) a current level on one of said *a* lines, and (3) one of said drive lines for a selected bit position for one group of words.

4. In combination, *abc* thin anisotropic magnetic film elements arranged in a matrix arrangement *a* x *bc* and having their easy magnetic axes aligned with respect to each other, said film elements forming a memory array of *ab* words of *c* bits each; an address bus adapted to carry address signals indicative of up to *ab* words locations; a first selector responsive to said address signals for selecting one of *a* lines; a second selector responsive to said address signals for selecting one of *b* lines; each one of said *ab* words being selected by a unique combination of one *a* line and one *b* line; sensed lines for respective bit positions for each word; said sensed lines lying perpendicular to the easy axis of each said film element; each one of said *b* lines being coupled respectively to *c* film elements of each group of film elements, said *b* lines being coupled parallel to the hard axis of said film elements; sensing means coupled to one word of each group of film elements, said sensing means adapted to generate a magnetic field orthogonal to the easy axes of said film elements; and *c* read "and" gates for each group of words, each read "and" gate adapted to receive (1) a current level on one of said *a* lines, and (2) one of said sensed lines for a selected bit position for one group of words.

References Cited

UNITED STATES PATENTS

| | | | |
|---|---|---|---|
| 3,047,843 | 7/1962 | Katz et al. | 340—174 |
| 3,195,114 | 7/1965 | Gunderson et al. | 340—174 |

BERNARD KONICK, *Primary Examiner.*

S. M. URYNOWICZ, *Assistant Examiner.*